United States Patent [19]

Spillman, Jr.

[11] Patent Number: 4,863,270

[45] Date of Patent: Sep. 5, 1989

[54] MULTI-MODE OPTICAL FIBER SENSOR AND METHOD

[75] Inventor: William B. Spillman, Jr., Charlotte, Vt.

[73] Assignee: Simmonds Precision Products, Inc., Wilmington, Del.

[21] Appl. No.: 238,668

[22] Filed: Aug. 31, 1988

[51] Int. Cl.⁴ .............................................. G01B 9/02
[52] U.S. Cl. ................................. 356/345; 250/227; 356/354
[58] Field of Search ................. 356/345, 354; 250/227

[56] References Cited

U.S. PATENT DOCUMENTS

| | | |
|---|---|---|
| 3,327,584 | 6/1967 | Kissinger . |
| 3,961,898 | 6/1976 | Neely et al. . |
| 4,297,684 | 10/1981 | Butter .................................. 340/557 |
| 4,339,661 | 7/1982 | Pitt et al. ............................. 250/227 |
| 4,367,460 | 1/1983 | Hodaa .................................. 340/550 |
| 4,377,341 | 3/1983 | Task et al. . |
| 4,443,698 | 4/1984 | Schiffner . |
| 4,482,890 | 11/1984 | Forbes et al. ........................ 340/556 |
| 4,515,479 | 5/1985 | Pryor .................................. 356/375 |
| 4,525,626 | 6/1985 | Kush et al. .......................... 250/227 |
| 4,538,140 | 8/1985 | Prestel ................................. 340/556 |
| 4,591,709 | 5/1986 | Koechner et al. ................... 250/221 |
| 4,653,906 | 3/1987 | Dunphy et al. . |
| 4,654,520 | 3/1987 | Griffiths . |
| 4,669,872 | 6/1987 | Ida . |
| 4,705,354 | 11/1987 | Ulrich . |

Primary Examiner—Davis L. Willis
Assistant Examiner—Matthew W. Koren
Attorney, Agent, or Firm—Dale R. Lovercheck

[57] ABSTRACT

A multi-mode fiber optic sensor and method for optically sensing a physical perturbation includes a multi-mode optical fiber segment that accepts coherent monochromatic radiation from a suitable source. As the radiation is propagated in the fiber the various modes form a complex interference pattern that changes in response to a physical perturbation of the fiber. A detector provides an output signal to a signal processor that analyzes the signal as a function of the change in intensity to provide an information signal that is functionally related to the perturbation.

10 Claims, 3 Drawing Sheets

MULTI-MODE OPTICAL FIBER SENSOR AND METHOD

BACKGROUND OF THE INVENTION

The present invention relates to optical fiber sensors and, more particularly, to a multi-mode optical fiber sensor and method for detecting changes in inter-mode interference patterns in response to external environmental perturbations.

Optical energy transmitted through the core of an optical fiber, either a single or multi-mode core, is affected by physical perturbations of the fiber. Typically, the physical perturbation will alter the index of refraction of the core material as well as the differential indices between the cladding and the core in such a way that the optical energy transmitted through the core is changed The physical perturbation can be caused by tension- or compression-induced strain as well as strain induced by bending the fiber about a small radius (i.e., micro-bending) or large radius bending (i.e., macro-bending). Accordingly, an optical fiber can be used as a sensor to measure a physical parameter by correlating changes in the output energy with the environmental perturbations.

The energy output from the sensing fiber can be analyzed, for example, in terms of quantitative changes in intensity, wavelength, or polarization states. In a more sophisticated context, the output light can be interferometrically compared against a reference source to provide an interferometer pattern that can be empirically correlated with the fiber-perturbing parameter. In the interferometric context, e.g., a Mach-Zender interferometer, coherent source light is passed through reference and sensing fibers with the light from the two paths combined to form an interferometric pattern that is analyzed to provide information that is functionally related to an external perturbation affecting the sensing fiber path.

Optical fiber sensing systems have a number of applications, especially in the aerospace field. For example, the wing or tail section of an aircraft can be 'fibered' and the output light analyzed to determine stress levels in the structure as well as the presence of pre-fracture conditions or the presence of fractures caused by fatigue or ballistic impact. In addition, optical fiber sensing systems have the advantage of an exceptionally wide band-width so that the fiber can serve both a sensing function as well as data transmission function.

SUMMARY OF THE INVENTION

In view of the above, it is an object of the present invention, among others, to provide a multi-mode optical fiber sensor and method for measuring physical perturbations using interferometric parameter analysis of perturbation-affected light propagated through a multi-mode optical fiber.

It is another object of the present invention to provide a multi-mode optical fiber sensor and method that reduces the optical fiber requirements in an application by providing a multi-function multi-mode optical fiber in which the measurement of physical perturbations using interferometric parameter analysis may be performed in conjunction with other functions, including data transmission, communications, control, and telemetry.

In view of these objects, and others, the present invention provides a multi-mode optical fiber sensor and method in which coherent monochromatic radiation from a optical energy source passes through a multi-mode optical fiber that is subjected to an external perturbation. As the light is conducted through the core, the various modes constructively and destructively interfere with one another with the projected output having a characteristic inter-modal "speckle" pattern. A detector, such as a two-dimensional staring array, outputs an electrical signal in response to the intensity distribution of the speckle pattern. As the fiber or a segment thereof is perturbed, the inter-modal interference pattern and the intensity distribution changes in a manner functionally related to the perturbation. The corresponding output of the detector is analyzed by a signal processor to provide a signal output representative of the perturbation.

In a first embodiment of the multi-mode fiber optic sensor in accordance with the present invention, a monochromatic light source, such as a laser diode, inputs coherent light into a multi-mode optical fiber segment that is subject to environmental perturbations. The coherent light, as it travels through the core, assumes different modes, including a lowest order and at least one higher order mode. The various modes constructively and destructively interfere to produce a characteristic 'speckle' pattern which is projected through a spatial filter onto a photo-detector. In its simplest form, the spatial filter is defined by a light-blocking sheet having one or more apertures that pass a subset of the speckle pattern to the photodetector the signal output of the photodetector varies in response to the variation in the intensity distribution of that portion of the speckle pattern passed to the photodetector by the spatial filter.

The output of the photodetector is provided to a signal processor with the change in the intensity distribution functionally related to the sensed perturbations.

In another embodiment of the invention, the output light from the multi-mode optical fiber is projected onto a multi-pixel CCD array. As the CCD array is scanned, its outputs are sent to a signal processor that converts the individual pixel output into a corresponding digital value and stores the digitized array output as two successive data frames. The absolute value of the change between corresponding pixel data points in the two data frames is summed to provide a signal output that is functionally related to the sensed perturbations.

In still another embodiment of the invention, a fiber perturbation region or zone is defined in which the multi-mode fiber optic sensor is sensitive to perturbation only within the defined region, for example, by providing single mode input and output optical fiber with a intermediate multi-mode optical fiber that is subjected to and senses the perturbations. The light is output through a spatial filter and one or more lenses to another multi-mode optical fiber segment which carries the light to the photodetector for processing.

The present invention advantageously provides a multi-mode optical fiber sensor in which the constructive and destructive interference of coherent light in a multi-mode fiber provides optical information useful in providing a signal that is functionally related to the sensed perturbation. Additionally, the sensing optical fiber can be used to also transmit other data, such as communications, control, telemetry, etc., on wavelength bands outside that used to provide perturbation sensing to provide a multi-function optical fiber.

DESCRIPTION OF THE PREFERRED EMBODIMENT

Figure 1:
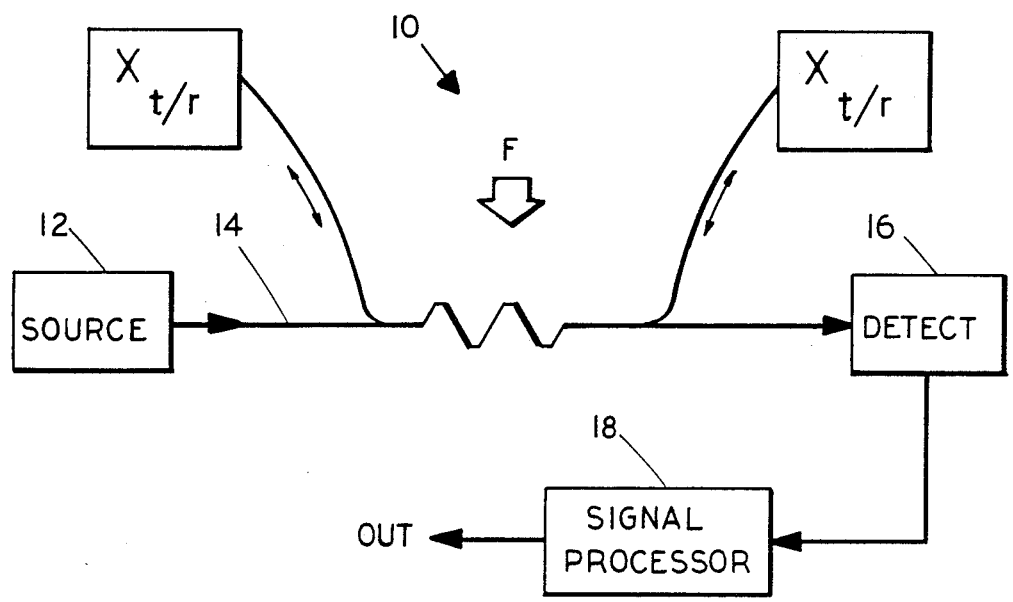
FIG. 1 is a schematic block diagram of a multi-mode fiber optic sensor in accordance with the present invention.

The organization of a multi-mode fiber optic sensor in accordance with the present invention is shown in functional block diagram form in FIG. 1 and is designated generally therein by the reference character 10. As shown, a monochromatic light source 12, such as a laser or laser diode, outputs coherent, monochromatic radiation into a multi-mode optical fiber segment 14. The optical fiber segment 14 has a core sufficiently large to accommodate the lowest order and at least one or more higher order modes and thus function as a multi-mode fiber with the different modes constructively and destructively interfering to form a complex interference pattern. A portion of the optical fiber segment 14, as represented by the sinuous portion in FIG. 1, is subjected to environmental perturbations which affects the optical path length of each mode and the resulting complex interference pattern. The perturbations can take the form of compressive strain as a function of a force F applied to the fiber, tensile strain, or a combination thereof caused by bending of the fiber or as a result of a change in environmental temperature or pressure.

The output radiation from the optical fiber segment 14, when projected onto a two-dimensional surface, presents the characteristic "speckle" pattern. Although the intensity distribution of the speckles changes slowly over time, the intensity of the total speckle pattern remains substantially constant. When the optical fiber segment 14 is perturbed, the distribution of the speckle pattern intensity changes in response to the perturbation, with some speckles becoming more intense, some less intense, and some remaining unchanged. A detector 16 receives the light output of the optical fiber segment 14 and provides a corresponding electrical output to a signal processor 18. The changes in the speckle pattern output from optical fiber segment 14 are analyzed, as explained below in relationship to FIGS. 2, 3. and 4, to provide information that is functionally related to the perturbation.

The optical fiber segment 14 of FIG. 1 can be used in a multi-function context to transmit data between transceivers $X_{t/r}$ coupled to the fiber segment 14 on opposite sides of the sensing region. It is contemplated that the present invention is particularly applicable to aircraft using optical fibers in a 'fly-by-light' context in which the fiber serves both a stress sensing function along with its communication, control, and telemetry functions.

Figure 2:
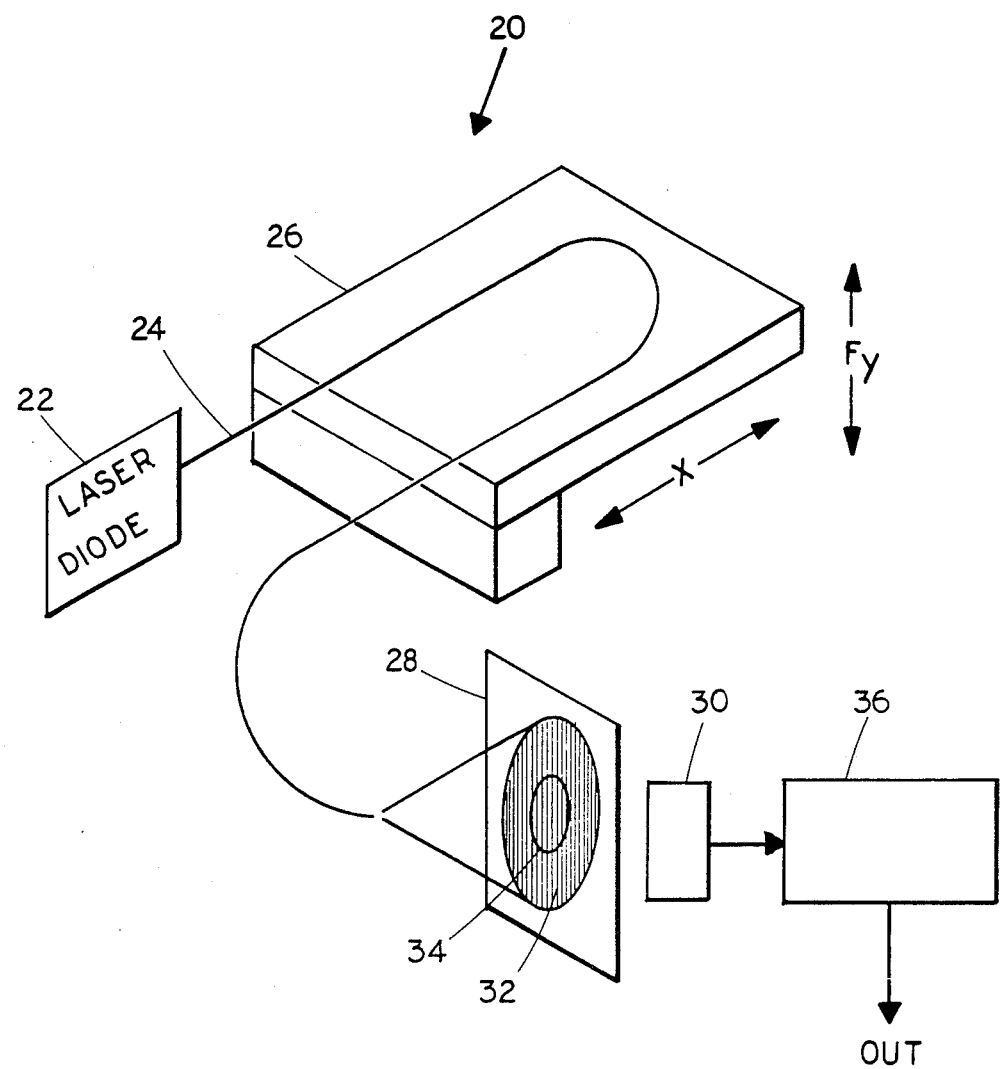
FIG. 2 is a schematic block diagram of a first embodiment of the multi-mode fiber optic sensor.

A first embodiment of the present invention is presented in general form in FIG. 2 and is generally designated therein by the reference character 20. As shown, a laser diode 22 outputs coherent monochromatic radiation into a multi-mode optical fiber segment 24 that is secured to or embedded within a structure 26 that is subjected to recurring bi-directional force $F_y$. In FIG. 2, the structure 26 is shown in solid-line illustration as a cantilevered beam although suitable structural applications include sensing stress in an aircraft wing. The optical fiber segment 24 is positioned along the X axis, normal to the axis of the perturbation force $F_y$. As the structure 26 is perturbed along the Y direction, the optical path length of each mode in the optical fiber segment 24 is affected to cause a change in the complex interference pattern of the light in the fiber core. The complex interference pattern is output from the optical fiber segment 24 and projected onto and through a spatial filter 28 onto a photodetector 30, which detector 30 may take the form of a two-dimensional photocell. The spatial filter 28, in its simplest form, is fabricated from a opaque sheet having one or more apertures so that a portion of the speckle pattern, indicated generally at 32, is blocked and a portion or subset thereof is allowed to pass to the photodetector 30. Since the intensity of the total circular speckle pattern 32 remains substantially constant because the average increase in intensity of some of the speckles will be statistically averaged with the average decrease in intensity of other of the speckles, no meaningful signal can be obtained if the entire speckle pattern 32 is presented to the photodetector 30. Accordingly, the spatial filter 28 functions to expose only a portion or subset of the speckle pattern 32 to the photodetector 30, so that a change in intensity can be detected. In general, the subset of the speckle pattern 32 provided by the spatial filter 28 to the photodetector 30 should be sufficiently large so that an adequate signal-to-noise ratio is obtained and sufficiently small so that statistical averaging effects do not prevent discrimination of the perturbation effect in the speckle pattern 32. The shape of the aperture of the spatial filter 28 is shown in FIG. 2 as a circular opening 34, although the shape of the aperture or apertures in the spatial filter 28 may be varied, for example, to form a predetermined rectangular matrix of circular holes. The photodetector 30 outputs an electrical signal in response to the intensity of the subset of speckle pattern 32 imaged onto the photodetector 30 through the spatial filter 28 so that variations in the intensity will provide a corresponding output.

A signal processor 36 accepts the output of the photodetector 30 and processes the signal to obtain an information signal functionally related to the perturbation. Since any movement of optical fiber segment 24 causes a change in the intensity of the speckle pattern 32 imaged onto the photodetector 30. the movement of optical fiber segment 24 will cause a corresponding change in the signal output of the photodetector 30 with the functional relationship empirically determined.

Figure 3:
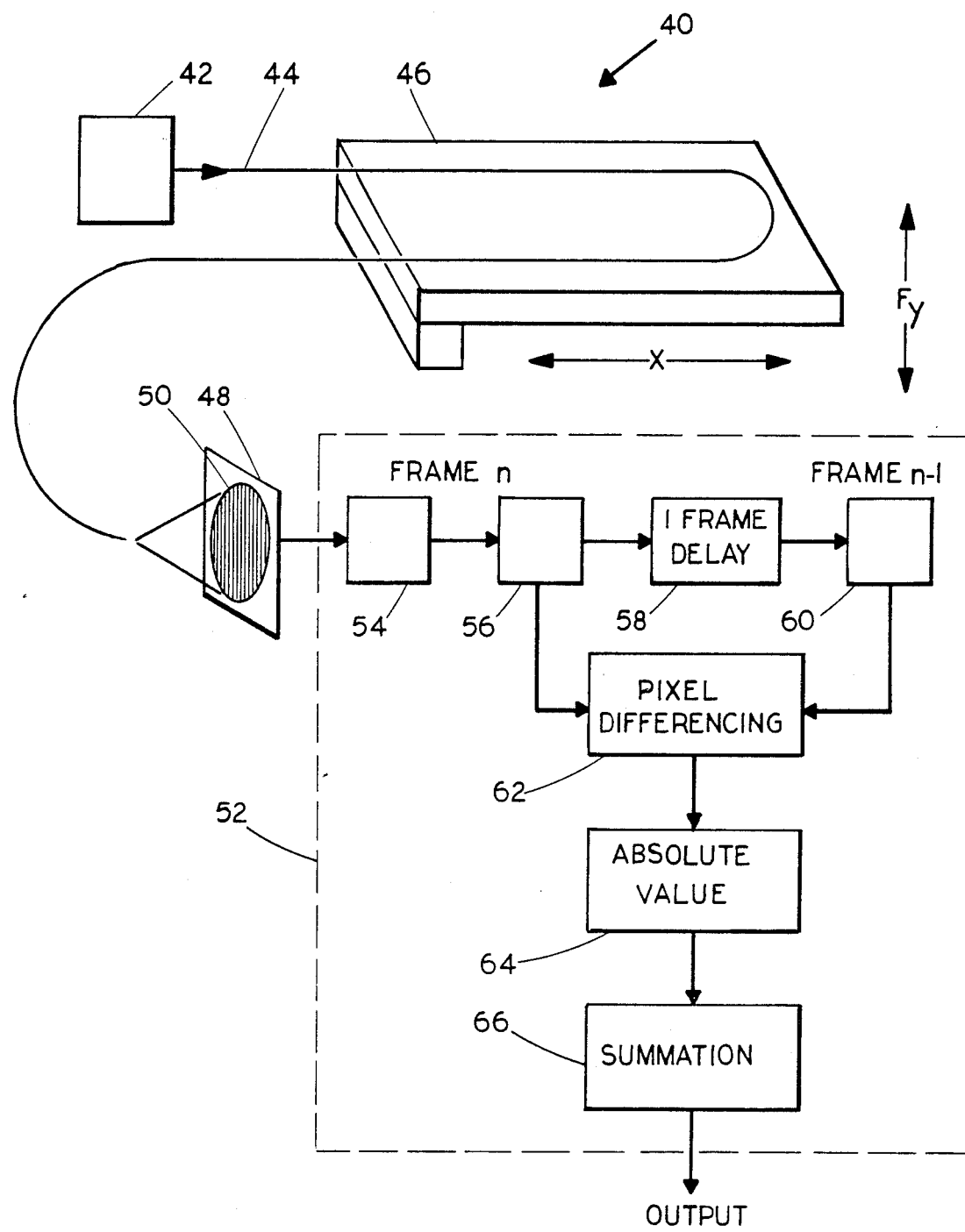
FIG. 3 is a schematic block diagram of a second embodiment of the multi-mode fiber optic sensor.

A second embodiment of the present invention is illustrated in FIG. 3 and is generally designated by the reference character 40. As shown therein, a laser diode 42 outputs coherent, monochromatic radiation into a multi-mode optical fiber segment 44 which is mounted upon or otherwise secured to a structure 46 that is subjected to a perturbation, for example, periodic movement in the Y axis in response to a bi-directional perturbing force $F_y$. The optical fiber segment 44 is positioned along the X axis, normal to the Y axis, for maximum sensitivity in a manner consistent with that illustrated in FIG. 2. The complex interference pattern produced by the optical fiber segment 44 is output onto a CCD array 48 as a characteristic speckle pattern 50. The CCD array 48 is preferably located a sufficient distance from the output end of the optical fiber segment 44 so that a pixel on the CCD array 48 is smaller than an average speckle feature; each pixel thereafter generates a signal in response to the intensity of radiation incident on that pixel.

A signal processor 52 accepts the output of the CCD array 48 and analyzes the information in a frame-by-frame manner with between a first frame and its immediately preceding frame providing information that is functionally related to the perturbation. More specifically, the intensity of the energy sensed by each pixel of the CCD array 48 is digitized by a digitizer 54 and stored in a first frame buffer 56. This initial frame data is transferred to a frame delay buffer 58, which holds the frame data for a selected time period, as another data frame is stored in the first data frame buffer 56. The initial frame data in the frame delay buffer 58 is then transferred to the second data frame buffer 60. Accordingly, a preceding $(n-1)^{th}$ data frame is held in the data frame buffer 60 and a subsequent $n^{th}$ data frame is held in the data frame buffer 56. Each buffer can take the form of a conventional memory with multi-bit memory locations that correspond to pixels in the CCD array 48. A differencing circuit 62 then compares the contents of the data frame buffers 56 and 60 on a pixel-by-pixel basis and converts the intensity differences into corresponding absolute values by an absolute value circuit 64, which circuit preferably includes memory locations that correspond to pixels of the CCD array 48. Lastly, the changes in intensities of the pixels of the CCD array 48 are accumulated in a summing circuit 66 to obtain a final value, which is output to some recording device or display. As successive data frame differences are determined, the final value output will vary as the sensing fiber segment 44 is perturbed. Thus, the signal processor 52 can precisely measure the perturbation of the optical fiber segment 44 by measuring the change in intensity of each individual speckle of the speckle pattern 50 on the CCD array 48.

As in the case of the embodiment of FIG. 3, a subset or portion of the speckle pattern 50 is evaluated to provide information functionally related to the perturbation. While a spatial filter can be employed in a manner analogous to that of FIG. 2, the same functional result can be obtained in the embodiment of FIG. 3 by disregarding or not reading the output of a selected percentage of the pixels of the CCD array 48 so that statistical averaging will not affect the ability to discriminate perturbations in the speckle pattern 50.

Figure 4:
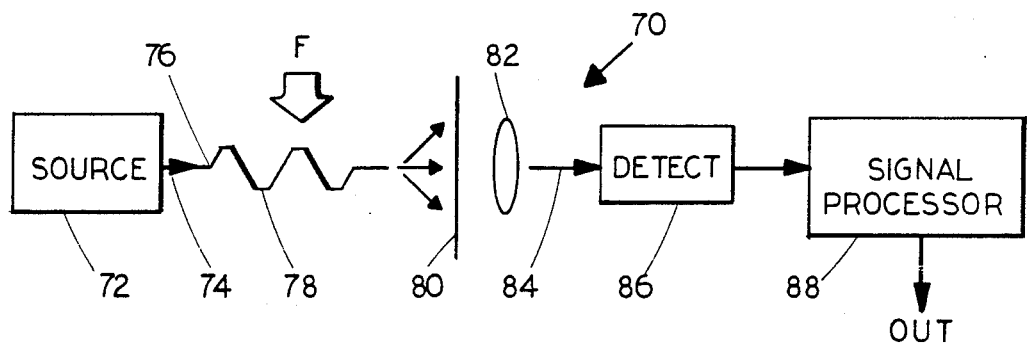
FIG. 4 is a schematic block diagram of a third embodiment of the multi-mode fiber optic sensor.

A third embodiment of the present invention is illustrated in FIG. 4 and designated generally therein by the reference character 70. As shown, an optical source 72 launches coherent radiation into a single-mode optical fiber segment 74 that is coupled at 76 to a multi-mode optical fiber 78 that is subjected to the perturbations to be sensed, thereby reducing error from undesired vibrations. After the desired perturbation has been sensed by the multi-mode optical fiber segment 78, the complex interference pattern is output from the multi-mode optical fiber segment 78 through a spatial filter 80. A subset of the complex interference patter passes through the spatial filter 80 and is focused through a lens 82 into a multi-mode optical fiber segment 84. The complex interference pattern is transmitted along the multi-mode optical fiber segment 84 to a photodetector 86, which outputs a signal in response to the intensity of the subset of the complex interference pattern passed by the spatial filter 80. The signal is output to a signal processor 88 for analysis in a manner analogous to that described above for the embodiment of FIG. 3.

The present invention advantageously provides a multi-mode optical fiber sensor in which the constructive and destructive interference of coherent light in a multi-mode fiber provides optical information useful in providing a signal that is functionally related to the sensed perturbation The invention is particularly useful in sensing information relating to stressed structures, such as those in aircraft and other vehicles and well as use as intrusion detection, for example.

As will be apparent to those skilled in the art, various changes and modifications may be made to the illustrated multi-mode optical fiber sensor and method of the present invention without departing from the spirit and scope of the invention as determined in the appended claims and their legal equivalent.

What is claimed is:

1. A multi-mode fiber optic senor sensitive to a physical perturbation comprising:
   a multi-mode optical fiber for transmitting optical energy between an input and an output in at least two modes to form an interference pattern between the at least two modes;
   a single mode optical fiber coupled to the input of said multi-mode optical fiber;
   means for providing optical energy to an input of said single-mode optical fiber for coupling to said multi-mode optical fiber, the optical energy sufficient to propagate in at least two modes along the multi-mode fiber, the interference pattern changing in response to a physical perturbation of the multi-mode fiber; and
   means for detecting an interference pattern from the output of said multi-mode optical fiber and for generating a signal functionally related to the perturbation and in response to an intensity variation of at least a part of the interference pattern.

2. A multi-mode fiber optic sensor as recited in claim 1, wherein said detecting means comprises:
   means for photodetecting a subset of the complex interference pattern from the output of said optical fiber segment, said photodetecting means generating said signal in response to a variation in the intensity of the subset of the complex interference pattern; and
   means for filtering disposed between the output and said photodetector means for providing the subset of the complex interference pattern to said photodetector means.

3. A multi-mode fiber optic sensor as recited in claim 2, wherein said photodetecting means comprises processing means for determining a difference in the intensity of two time-separated subsets of the complex interference pattern.

4. A multi-mode fiber optic sensor as recited in claim 3, wherein said filtering means comprises an opaque surface having at least one aperture for passing a subset of the complex interference pattern.

5. A multi-mode fiber optic sensor as recited in claim 4, wherein said filtering means comprises an opaque surface having at least one circular hole.

6. A multi-mode fiber optic sensor as recited in claim 1, wherein said detecting means comprises a CCD array having a plurality of pixels, each said pixel being smaller than an average speckle of said complex interference pattern.

7. A multi-mode fiber optic sensor as recited in claim 6, wherein said detecting means determines a difference in the intensity of selected speckles of the complex interference pattern over time and sums the absolute value of the difference thereof.

8. A multi-mode fiber optic sensor as recited in claim 1, wherein said means for detecting determines a difference in intensity of part of the interference pattern, the difference corresponding to physical perturbation.

9. A multi-mode fiber optic sensor as recited in claim 8, further comprising:
    filtering means for filtering the interference pattern prior to detection by said detecting means.

10. A multi-mode fiber optical sensor as recited in claim 9, wherein said filtering means comprises an opaque surface having at least one aperture for passing a subset of the complex interference pattern.

* * * * *

UNITED STATES PATENT AND TRADEMARK OFFICE
CERTIFICATE OF CORRECTION

PATENT NO. : 4,863,270

DATED : September 5, 1989

INVENTOR(S) : William B. Spillman, Jr.

It is certified that error appears in the above-identified patent and that said Letters Patent is hereby corrected as shown below:

Column 1, Line 18, " changed The "

should read -- changed. The --

Column 2, Line 31, " photodetector the "

should read -- photodetector. The --

Column 4, Line 53, " 30. "

should read -- 30, --

Signed and Sealed this

Twenty-fourth Day of July, 1990

Attest:

HARRY F. MANBECK, JR.

*Attesting Officer*     *Commissioner of Patents and Trademarks*